July 19, 1966 R. W. SMITH 3,261,583
HOUSEHOLD APPLIANCE REST
Filed June 29, 1964 3 Sheets-Sheet 1

INVENTOR
RAYMOND W. SMITH
BY
Harry Cahill
ATTORNEY

July 19, 1966 R. W. SMITH 3,261,583
HOUSEHOLD APPLIANCE REST
Filed June 29, 1964 3 Sheets-Sheet 2

INVENTOR
RAYMOND W. SMITH
BY
ATTORNEY

July 19, 1966  R. W. SMITH  3,261,583
HOUSEHOLD APPLIANCE REST
Filed June 29, 1964  3 Sheets-Sheet 3
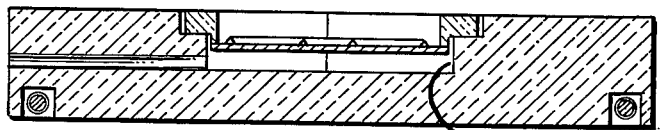
_Fig_-7-
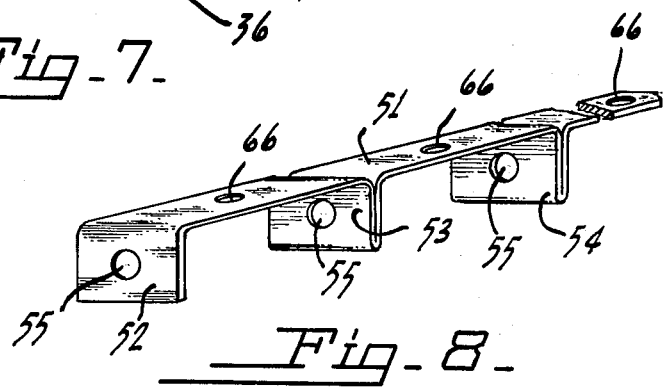
_Fig_-8-
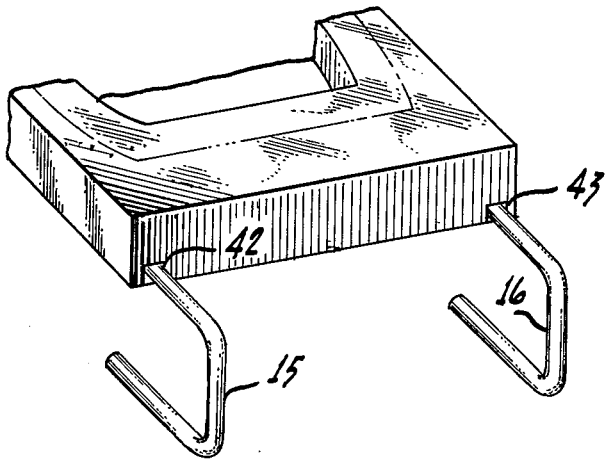
_Fig_-9-
INVENTOR
RAYMOND W. SMITH
BY
ATTORNEY

United States Patent Office 3,261,583
Patented July 19, 1966

3,261,583
HOUSEHOLD APPLIANCE REST
Raymond W. Smith, 8621 55th Road, Elmhurst, N.Y.
Filed June 29, 1964, Ser. No. 378,860
2 Claims. (Cl. 248—117.2)

The present invention relates to rests, supports or bases for household appliances, and more particularly to a rest or support for a heated appliance such, for example, as an electric iron of the dry, spray or steam type.

In accordance with the invention there is provided a rest that firmly, but conveniently, holds a hot appliance with no danger of the appliance falling from its intended position during "standby" periods. In the iron rest embodiment of the invention, the iron can be placed down flat and the iron rest is securely connected to an ironing board in a detachable manner.

The primary object of the present invention is to provide a novel, safe and convenient appliance rest.

Another object of the present invention is to provide a novel rest for a pressing iron, or the like, of any type.

A further object of the present invention is to provide a novel rest having a vented appliance holding member.

A still further object of the present invention is to provide a novel rest having a vented appliance holder member and a vented body member with means for attachment to a device, such as an ironing board.

Other and more specific objects of the invention will become apparent from a consideration of the following specification and claims in connection with the accompanying drawing illustrating one preferred form of the invention, in which:

FIGURE 7 is a view in section on line 7—7 of FIGURE 1;

FIGURE 8 is a perspective view of a further detail;

FIGURE 9 is an enlarged view in perspective of the holding means.

Figure 1:
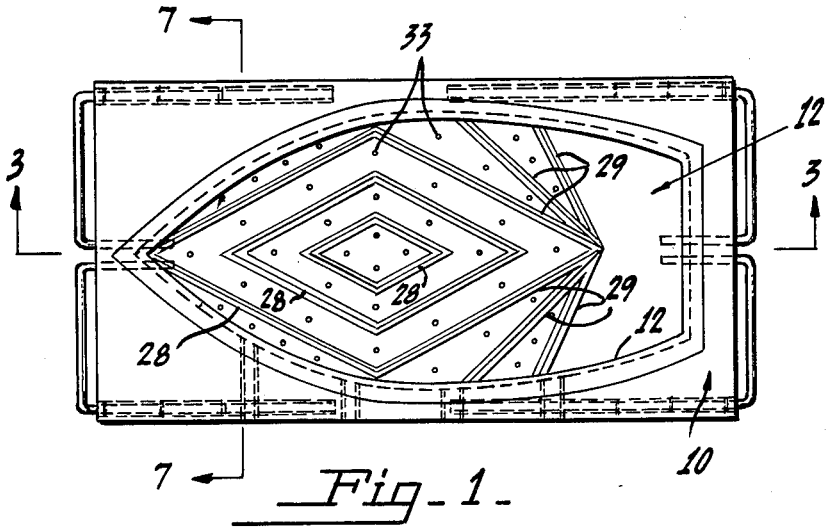
FIGURE 1 is a top plan view of the rest of the present invention.

The appliance rest of the present invention comprises a main body 10 and an appliance holder member 12. The main body is provided with rods 14, 15, 16 and 17 for engaging a device or support, such as an ironing board 20. The rods 14 to 17 and their spring features will be later described.

The appliance holder member 12 is generally pan-shaped and as shown can conform somewhat to the outline form of the appliance. Preferably, the center well 22 is larger in outline than the outline of the appliance—in this case an electric pressing iron. This permits freedom in setting the iron in the well so that it can be readily placed therein. A flange 23 engages a seat or recess 24 in the main body 10.

The bottom 26 of the member 12 is provided with diamond shaped ribs 28 and flaring ribs 29. These ribs provide a spacing support for the bottom of the sole plate for the iron and stiffen the bottom 26. A plurality of holes 33 provides vapor or steam communication with the depression 36 in the main body 10. The holes are spaced as shown and sufficient in number so that vapor escape is provided in any position of the iron in the well 22.

Figure 3:
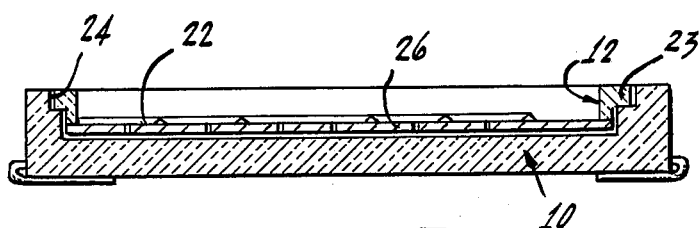
FIGURE 3 is a view in section on line 3—3 of FIGURE 1.
Figure 4:
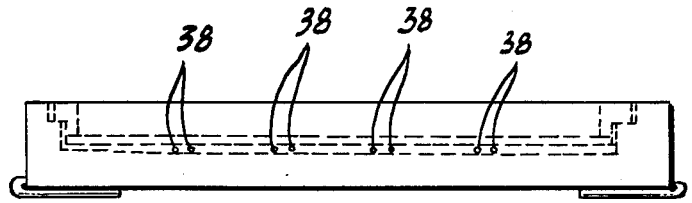
FIGURE 4 is a side view.
Figure 5:
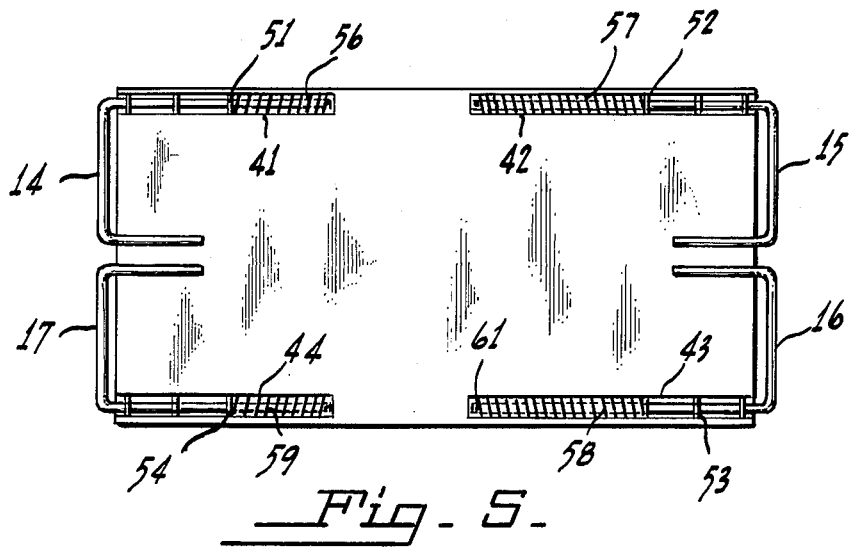
FIGURE 5 is a bottom plan view.

As shown in FIGURES 3 and 7, the holder member 12 may be of two part assembled construction with the bottom 26 separate from the rim bearing the flange 23. However, it is preferred that the member 12 be of one piece construction and made of metal. Aluminum is preferred.

The main body 10 is formed of plastic, metal or any suitable material. If of plastic, a heat resistant plastic is preferred. It is to be noted that the features of the member 12 and its size efficiently dissipates heat and will not concentrate it on the seat 24 or any part of the body 10.

The bottom 26 of the member 12 is spaced from the bottom of the depression 36 so as to provide a vapor or steam space. Vents 38 are provided for escape of this steam. These vents are provided on one side only of the main body 10 so that the user will not be subjected to steam or vapor discomfort.

Figure 2:
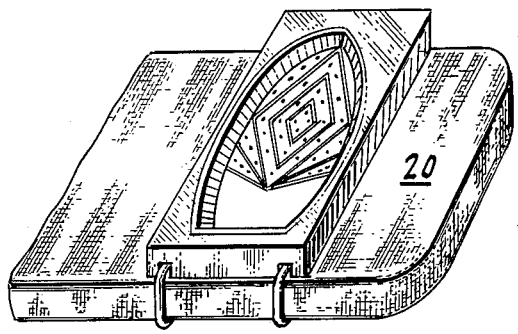
FIGURE 2 is a view in perspective of the rest on a support, such for example as an ironing board.
Figure 6:
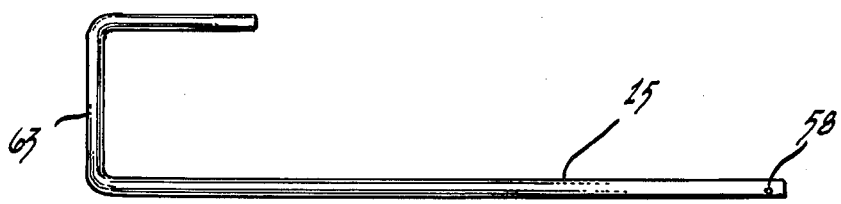
FIGURE 6 is a view of a detail.

The under side of the body 10 is provided with four recesses 41 to 44 for each of the four rods 14 to 17. These rods engage the ironing board 20 when retracted and released against the board as shown in FIGURE 2. The rods are received by rod holders 51 to 54 and biased by springs 56 to 59. Only one rod holder, spring and rod will be described in detail as they are all similar. The rod 15, FIGURE 6, is provided with a hook portion 63 at its end for engagement with the board 20 as shown in FIGURE 2.

The rod holder 51, FIGURE 8, is provided with an apertured tang 52 and two apertured folds 53 and 54. The aligned apertures 55 receive the rod 15 which is apertured at 58 to receive a pin 61 against which the spring 58 bears. The other end of the spring 58 bears against the fold 54. The pin 61 also affords a ready means of assembly. The rod holder 51 is apertured, as at 66 to receive suitable fastening means, such as screws.

In use, the rods 51 to 54 are withdrawn against the compression of the springs and when released will firmly engage the board 20.

If desired the main body can be enlarged at one or more regions, each of which is provided with a well or depression to hold articles such as buttons, pins, needles or a lubricant for the iron sole plate. The latter is usually paraffin wax.

The invention claimed is:

1. A rest for an electric iron of the steam type comprising, a main body member, an appliance holder member and clamping means to detachably secure said rest to a support, said body member having side walls to define a recess, a peripheral seat formed in said side walls, said appliance holder member having a peripheral flange to be received by said seat with the bottom of said appliance holder member spaced from the bottom of said recess, a plurality of diamond shaped ribs on said appliance holder member on the upper surface thereof within the area defined by said flange, said area being depressed, a plurality of radiating ribs adjacent said diamond shaped ribs, a plurality of venting means for steam in said holder member within the area bearing said ribs, a second plurality of venting means for steam in said body communicating with said space between the said bottom of said holder member and said body member, said clamping means comprising rod holders secured to the under side of said body member in nonprojecting relationship, a plurality of rods slidable laterally of said body member in said rod holders, springs biasing said rod members inwardly with respect to the periphery of said body member, and each rod having a hook to engage beneath said support.

2. A rest for an electric iron of the steam type comprising a main body member, a steam iron holder member and clamping means to detachably secure said rest to a support, said body member having side walls to define a recess, a peripheral seat formed in said side walls, said iron holder member having a peripheral flange to be received by said seat with the bottom of said iron holder member spaced from the bottom of said recess, a plurality of diamond shaped ribs on said iron holder member on the upper surface thereof within the area defined by said flange, said area being depressed, a plurality of radiating ribs adjacent said diamond shaped ribs, a plurality of venting means for steam in said holder member within the area bearing said ribs, a second plurality of venting means for steam in said body communicating with the space between said bottom of said holder member and said body member, said clamping means comprising rod holders secured to the underside of said body member in nonprojecting relationship, a plurality of rods slidable laterally of said body member in said rod holders, a spring biasing said rod members inwardly with respect to the periphery of said body member, each rod having a hook to engage beneath said support, said rod holders each having an apertured tang and two apertured folds, said apertures being aligned to receive one of said rods, one of said folds being further removed from said tang than the other of said folds, one each of said springs seating against said one of said folds further removed from said tang, a fastening means on each of said rods at the end remote from said hook, and the opposite end of said spring seating against said fastening means.

References Cited by the Examiner

UNITED STATES PATENTS

| | | | |
|---|---|---|---|
| 1,277,865 | 9/1918 | Coggins | 248—117.2 |
| 1,455,026 | 5/1923 | Jorgensen | 248—117.6 |
| 1,773,676 | 8/1930 | Hennessey | 248—117.6 |
| 3,080,141 | 3/1963 | Ricci | 248—117.1 |

CLAUDE A. LE ROY, *Primary Examiner.*

K. J. WINGERT, *Assistant Examiner.*